AUTOMATIC TELEPHONE SYSTEM WITH AUTOMATIC TRANSFER

Filed March 1, 1955 7 Sheets-Sheet 1

INVENTORS
N. E. NILSSON
J. C. H. BJÖRK
G. O. RODNERT
P. G. JONSSON
BY
ATTORNEY

INVENTORS
N. E. NILSSON
J. C. H. BJÖRK
G. O. RODNERT
P. G. JONSSON
BY [signature]
ATTORNEY Oct. 20, 1959 N. E. NILSSON ET AL 2,909,607

AUTOMATIC TELEPHONE SYSTEM WITH AUTOMATIC TRANSFER

Filed March 1, 1955 7 Sheets-Sheet 3

INVENTORS
N. E. NILSSON
J. C. H. BJÖRK
G. O. RODNERT
P. G. JONSSON

By [signature]
ATTORNEY

INVENTORS
N. E. NILSSON
J. C. H. BJÖRK
G. O. RODNERT
P. G. JONSSON
BY [signature]
ATTORNEY

AUTOMATIC TELEPHONE SYSTEM WITH AUTOMATIC TRANSFER

Filed March 1, 1955 7 Sheets-Sheet 5

INVENTORS
N. E. NILSSON
J. C. H. BJÖRK
G. O. RODNERT
P. G. JONSSON
BY [signature]
ATTORNEY

AUTOMATIC TELEPHONE SYSTEM WITH AUTOMATIC TRANSFER

Filed March 1, 1955 7 Sheets-Sheet 6

INVENTORS
N. E. NILSSON
J. C. H. BJÖRK
G. O. RODNERT
P. G. JONSSON

BY [signature]
ATTORNEY

AUTOMATIC TELEPHONE SYSTEM WITH AUTOMATIC TRANSFER

Filed March 1, 1955 7 Sheets-Sheet 7

INVENTORS
N. E. NILSSON
J. C. H. BJÖRK
G. O. RODNERT
P. G. JONSSON

By [signature]
ATTORNEY

United States Patent Office 2,909,607

Patented Oct. 20, 1959

2,909,607

AUTOMATIC TELEPHONE SYSTEM WITH AUTOMATIC TRANSFER

Nils Emil Nilsson and John Carl Harold Björk, Stockholm, Gustav Oscar Rodnert, Hagersten, and Per Gustaf Jonsson, Sodertalje, Sweden, assignors to Telefonaktiebolaget L M Ericsson, Stockholm, Sweden, a corporation of Sweden Application March 1, 1955, Serial No. 491,414

Claims priority, application Sweden March 27, 1954

6 Claims. (Cl. 179—6)

The present invention refers to automatic telephone systems with automatic transfer service of telephone calls from one number to another. The invention is limited to such telephone systems, which comprise registers and selectors and a marker for setting the selectors according to the registration in said registers.

In such system it is known to arrange a multiple with groups of marking wires for marking the number of a called subscriber's line, and a number of relay sets, each comprising a registering device for a subscriber's number and a control device, which, with the aid of said multiple, controls when there is a call to said subscriber's number. The registering device of the relay sets have thereby, after order, been set by an operator, to which the calls are then automatically connected by means of a special signal to the register which controls the connection.

The object of the present invention is to give all the subscribers a possibility to transfer their incoming calls to another subscriber's number, an electric talking machine, a buzzer signal emitter or an operator in a simple manner and without the aid of an operator. This is achieved according to the invention partly by means of a second registering device in the relay set, to which a called number is transferred from said register by a preliminary call to a special directive number, partly by a relay in the marker which is operated by a control device in the relay set at the following call to the said subscriber's number and which switches the circuit of the marker for setting said selector according to the registration in the first mentioned registering device in the relay set instead of according to the registration in said register.

The invention will be described more in detail with reference to the accompanying drawings Figs. 1–7.

Figs. 3–7 are placed in a row in numerical succession.

Figure 1:
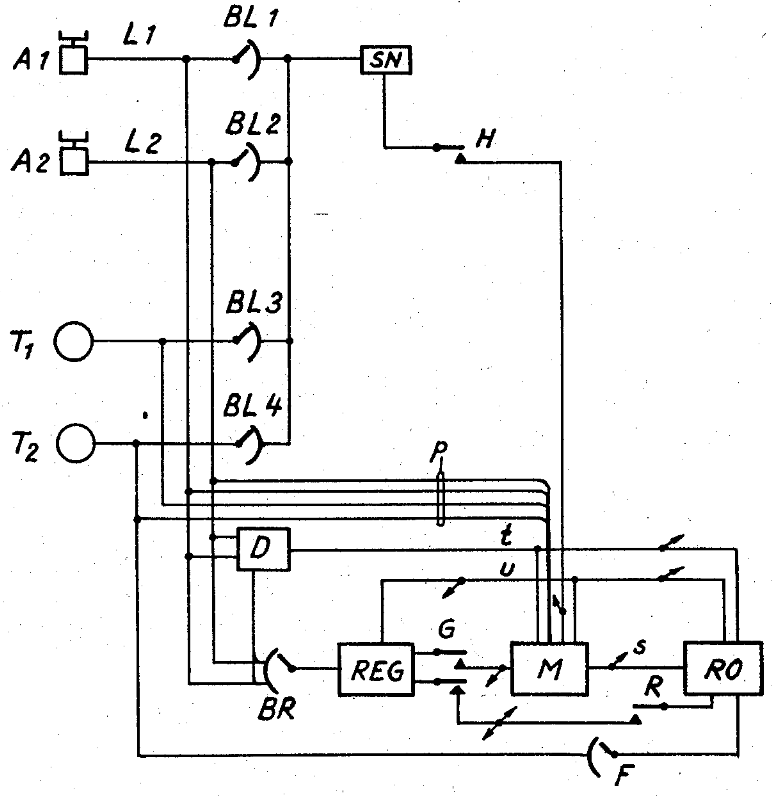
Fig. 1 shows a trunk layout of an embodiment of the invention, in which the relay sets RO are set directly by the identified D. This embodiment is the basis of the detailed description in Figs. 3–7.

In Fig. 1, A1 and A2 are subscriber's instruments, L1 and L2 subscriber's lines, T1 and T2 electrical talking machines and BL1–BL4 selectors, which connect the subscriber's instruments and the electrical talking machine to the link circuits SN so, that a connection is put through. There are furthermore a number of registers REG, each of which has a register-finder BR, a marker M and connecting relays G for the registers and R for a number of relay sets RO. Two multiples *t* and *u* are connected to the marker. The multiple *t* goes out from the identified D and is used to determine the number of a calling subscriber's line. The multiple *u* goes out from the register and is used to transmit the number of a called subscriber's line to the marker and to the relay sets RO and for the switch control of the calls within the exchange. A bunch of wires *p* is used to point out the lines which are to be connected to each other. An electrical talking machine T2 is by means of a relay device F connected to a relay set RO, and by means of relays H the marker selects a free link circuit.

At a call from the instrument A1 the line L1 is connected over a finder BR to a register REG. The subscriber at the instrument A1 hears the dialling tone from the register and dials the number of for example the instrument A2 whereby the number is registered in the register REG and the dialling tone disappears. If the marker M is free the register REG is connected over a relay G to the marker M and marks the called number in the multiple *u*. Simultaneously, the register actuates the identifier D, which indicates the number of the calling line in the multiple *t*. The marker selects a free link circuit SN by operation of a relay H and sets the selectors BL1 and BL2 through circuits over the wires *p*. A connection is obtained between the instruments A1 and A2 through the lines L1 and L2, the selectors BL1 and BL2 and the link circuit SN.

If the subscriber at instrument A2 leaves his own location and goes to the subscriber with instrument A1, he can switch over his telephone calls from the instrument A2 to the instrument A1. This takes place at instrument A1 and is effected by first selecting a directive number 09 and thereafter the number of instrument A2. When the directive number 09 is received in register REG, it is registered on a relay in the register, whereafter the register is restored to normal without being disconnected. The subscriber hears dialling tone again and dials the number of instrument A2, which is registered in the register. The register is thereafter connected over a relay G to the marker M and a relay R selects and actuates a free relay set RO. Simultaneously, the register actuates the identifier D. The marker M is prevented from setting up a connection. Instead, the number of the calling instrument A1 is transmitted by means of the multiple *t* to the selected relay set RO, and the number of instrument A2 registered in the register is transmitted by means of multiple *u* to the selected relay set RO, which, after having registered the numbers, emits a signal to the register REG for disconnection of the marker. The calling subscriber again hears a dialling tone and has now to put down his handset. Thereafter the relay set RO controls all the numbers which are called, and switches the marker by means of signal wires *s* so that all the calls to the instrument A2 are automatically switched to the instrument A1.

If the subscriber at A1 dials the directive number 02 instead of 09, no further dialling is thereafter required, but the number 02 is transmitted together with the number of instrument A1 to a free relay set RO, which thereafter switches all the calls to the instrument A1 to an electric talking machine T1, which sends a prerecorded message, for example, "away, call the information."

If the subscriber at A1 dials the directive number 00 instead of 09 no further dialling is necessary, but the digit combination 00 is transmitted together with the number of the instrument A1 to a relay set RO, which by means of a selector F first selects a free electrical talking machine with recording means and then connects the calling subscriber to said machine. A tone frequency signal is emitted from the recording means of the electrical talking machine to the calling subscriber, whereafter the latter has 30 seconds to record a message, for example "back between 4 and 5 p.m." After said 30 seconds the electrical talking machine is switched for emission, the subscriber controls his message and puts down his handset. Thereafter all the calls to the instrument A1 are switched so as to be recorded in the electric talking machine T2.

There is a special directive number 01 for disconnecting the relay set RO. A subscriber, who wants to cancel an order of transfer, dials the directive number 01, whereby the register REG registers 01 by actuating a relay, restores its registering mechanism to normal and again sends a dialling tone. The subscriber thereafter dials his own number, and the switch, which has registered said number, is actuated and disconnected. The subscriber hears for the third time dialling tone from the register and has now to put down his handset.

Figure 2:
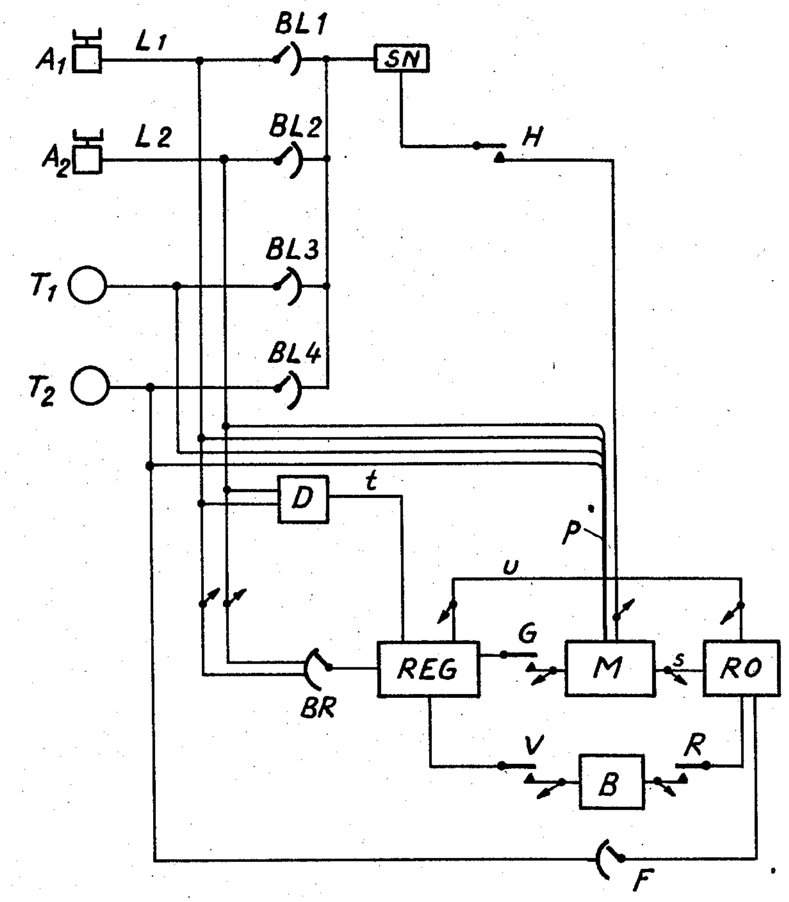
Fig. 2 shows a trunk system for another embodiment, in which the identified D in a known manner sets a registering device in the register REG and a special bypath V—B—R has been arranged between the register and the relay set RO.

Fig. 2 shows another embodiment of the invention. The register REG is provided with an additional registering device, which in connection with a call is in a known manner automatically set by means of the identifier D and which registers the number of the calling subscriber's line. If, thereafter, a directive number is dialled, the first digit of which is 0, the register REG connects itself by means of a relay V to an auxiliary marker B, which in its turn selects and connects itself to a free relay set RO by means of a relay R. The register REG thereafter transmits as well the calling subscriber's as the called subscriber's number to the selected relay set RO. The auxiliary marker is thereafter disconnected and the register emits a dialling tone to the calling subscriber to show that the connecting process is over and that the subscriber has to put down his handset.

The multiple *u* is in this case used only for the following control of the called subscriber's number in the relay set RO. The marker M is only used for connection of the communication. The register REG is hereby connected over a relay G to the marker M and as well the calling as the called subscriber's number is transmitted to the marker. The called number is simultaneously marked in the multiple *u*. At call to the directive digit 00 for the electrical talking machines T2 the marker is also connected, and sets up the communication between the calling subscriber's line, for example A1, and the selected electrical talking machine by setting the selectors BL1 and BL4 on one of the links SN. The marker M thereby receives an indication of the selected electrical talking machine from the selector F over RO and a signal wire *s*.

Figs. 3–7 are more detailed circuit diagrams in an automatic exchange, to which the invention according to the embodiment shown in Fig. 1 has been applied. The exchange consists of crossbar switches and electromagnetic relays. Each subscriber's instrument A1—A2 and electrical talking machine T1—T2 has an operating bar in the cross-bar switch. Each operating bar has a number 10—30 of contact spring sets for connecting links SN to a corresponding number. Several of the crossbar switches are connected to the same link so that each link has one contact spring set in each operating bar for cross-bar switches.

Figure 3:
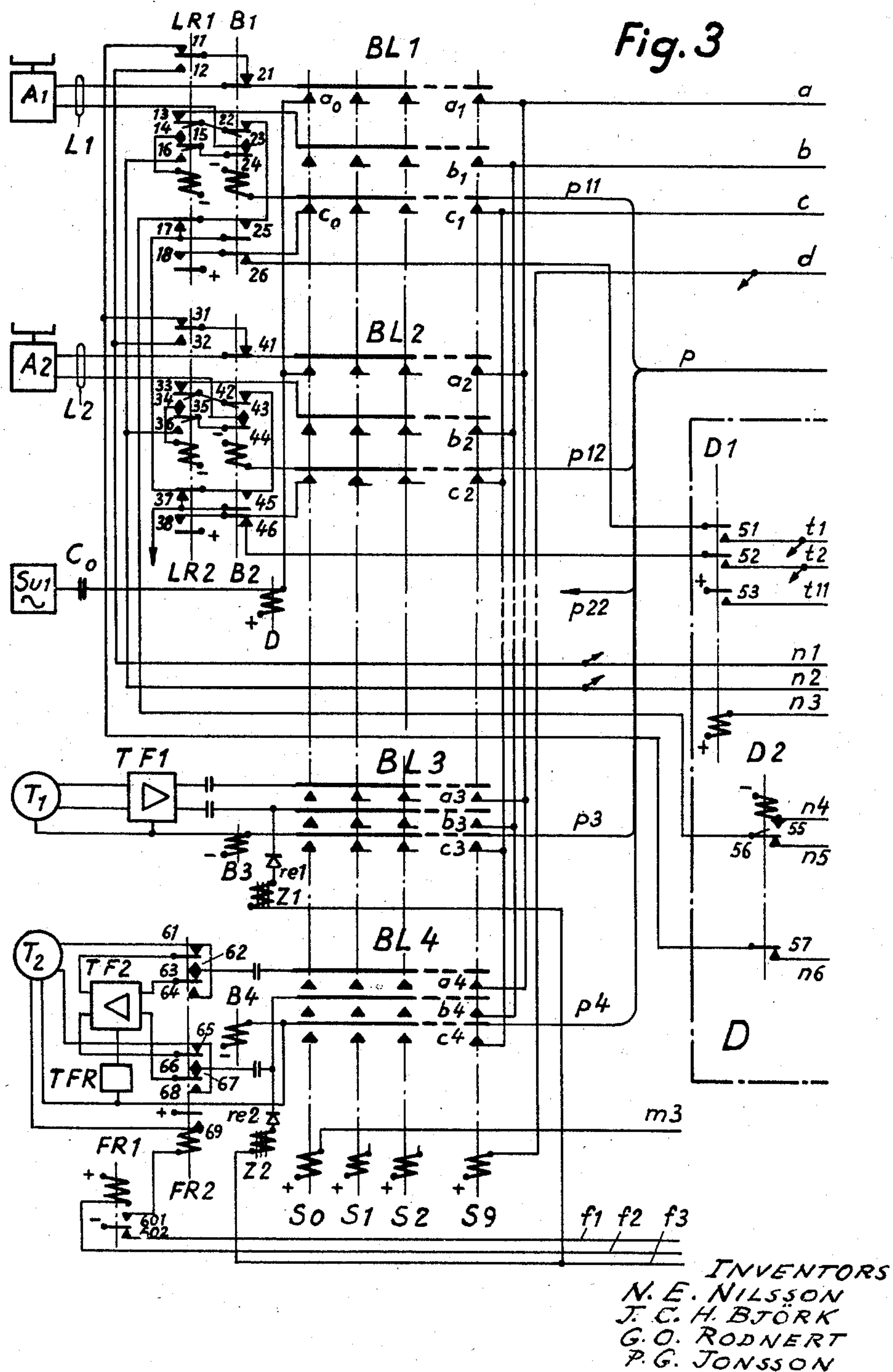
Fig. 3 shows the selecting devices in an automatic telephone system according to the invention.

In order to simplify the description, Fig. 3 only refers to a quite small exchange with 9 links corresponding to the selecting magnets S1—S9. Selecting magnets in a number of cross bar switches are connected in parallel so that a link SN in Fig. 4, which is indicated by a circuit over wire *d*, is selected for all the subscriber's lines and electrical talking machines simultaneously.

Figure 4:
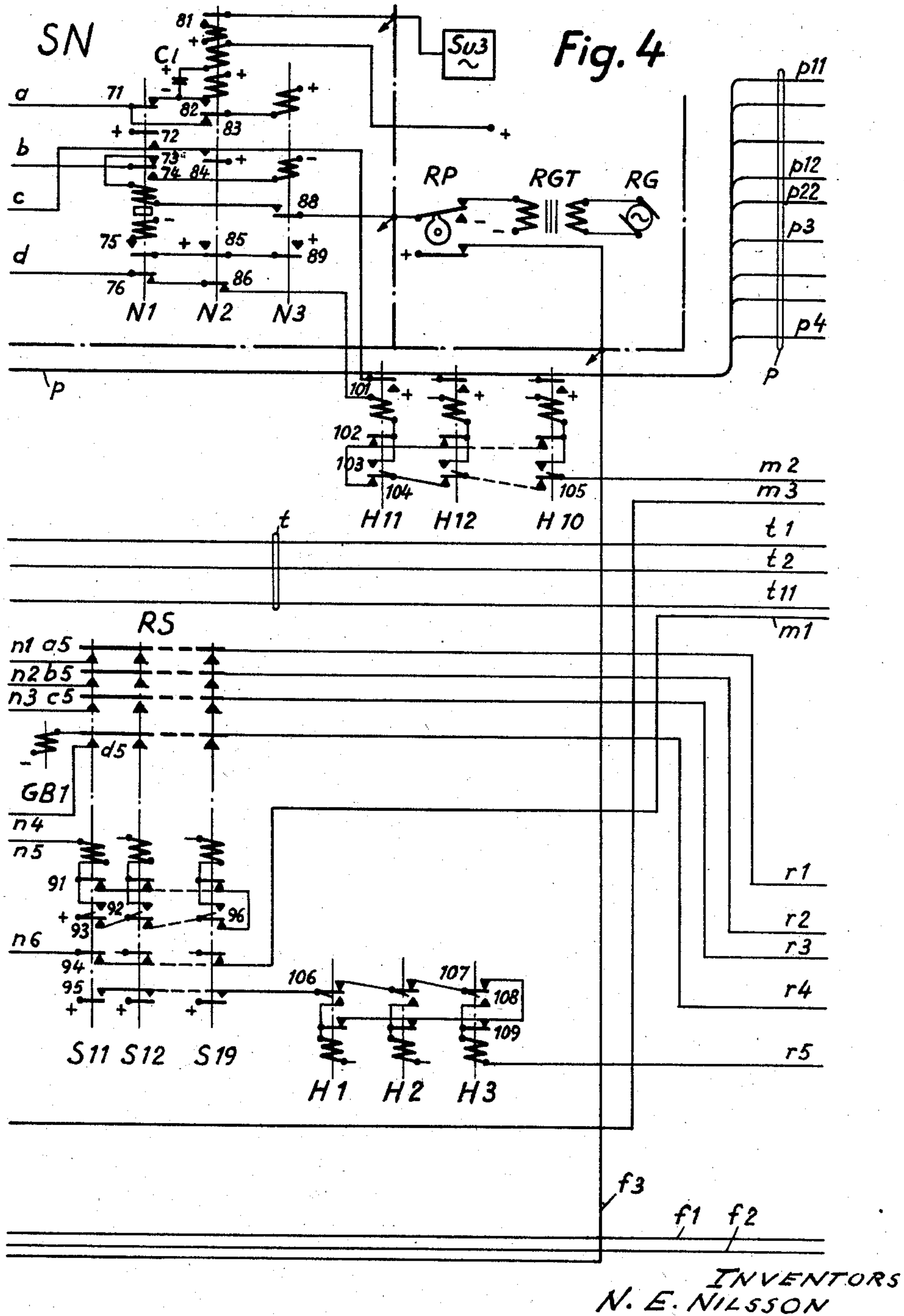
Fig. 4 shows a link circuit SN and a register-finder RS.

The register finders RS in Fig. 4 are operating bars in a special cross-bar switch with selecting magnets S11—S19. The links SN in Fig. 4, the register REG in Fig. 5 and the relay sets RO in Fig. 7 as well as the marker M and the identifier D consist of relays. The selectors F are relay means shown in Figs. 6, 7. The subscriber's lines L1—L2 in Fig. 3 are each provided with a line relay LR1—LR2 and are grouped by tens. The operating magnets B1—B2 serve as break relays. The line relays LR1—LR2 are used for connecting the subscriber's lines to register-connecting-wires *n*1—*n*2 common to each tens, which simplifies the connection to the register and the identification. This is achieved by arranging the line relays within each tens in a chain so that only one line relay at a time within the tens can attract its armature. The subscriber's numbers are two-digit numbers and the busy time for the registers is short, so that no annoying wait will arise owing to only one subscriber at a time being able to set up a connection within each tens. The register finders RS in Fig. 4 each have one position for each tens subscribers, which means that the selecting magnets S11—S19 each pertain to a tens.

If a call is put through from the instrument A1, which is supposed to have the number 11, to the instrument A2, which is supposed to have the number 12, the following connecting process takes place. When the subscriber at the instrument A1 lifts his handset, the line relay LR1 attracts in the following circuit: +, contacts 461—471 on relays G in Fig. 6, wire *m*1, contact 94 in Fig. 4, wire *n*6, contacts 57, 11 and 21, loop over line L1 and instrument A1, contacts 24 and 15, winding on relay LR1 to negative. The contacts 11—18 are actuated. The contact 17 breaks the operation circuit for relay LR2 and the other line relays pertaining to the same tens as LR1. Relay LR1 breaks the contact 15 and is kept energized through contact 14 in the following circuit: +, the contacts 93—96 and 91 in Fig. 4, winding on selecting magnet S11, wire *n*5, contacts 56, 22 and 14, winding on relay LR1, to negative. The selecting magnet S11 attracts. The contacts 91—95 are actuated.

Figure 5:
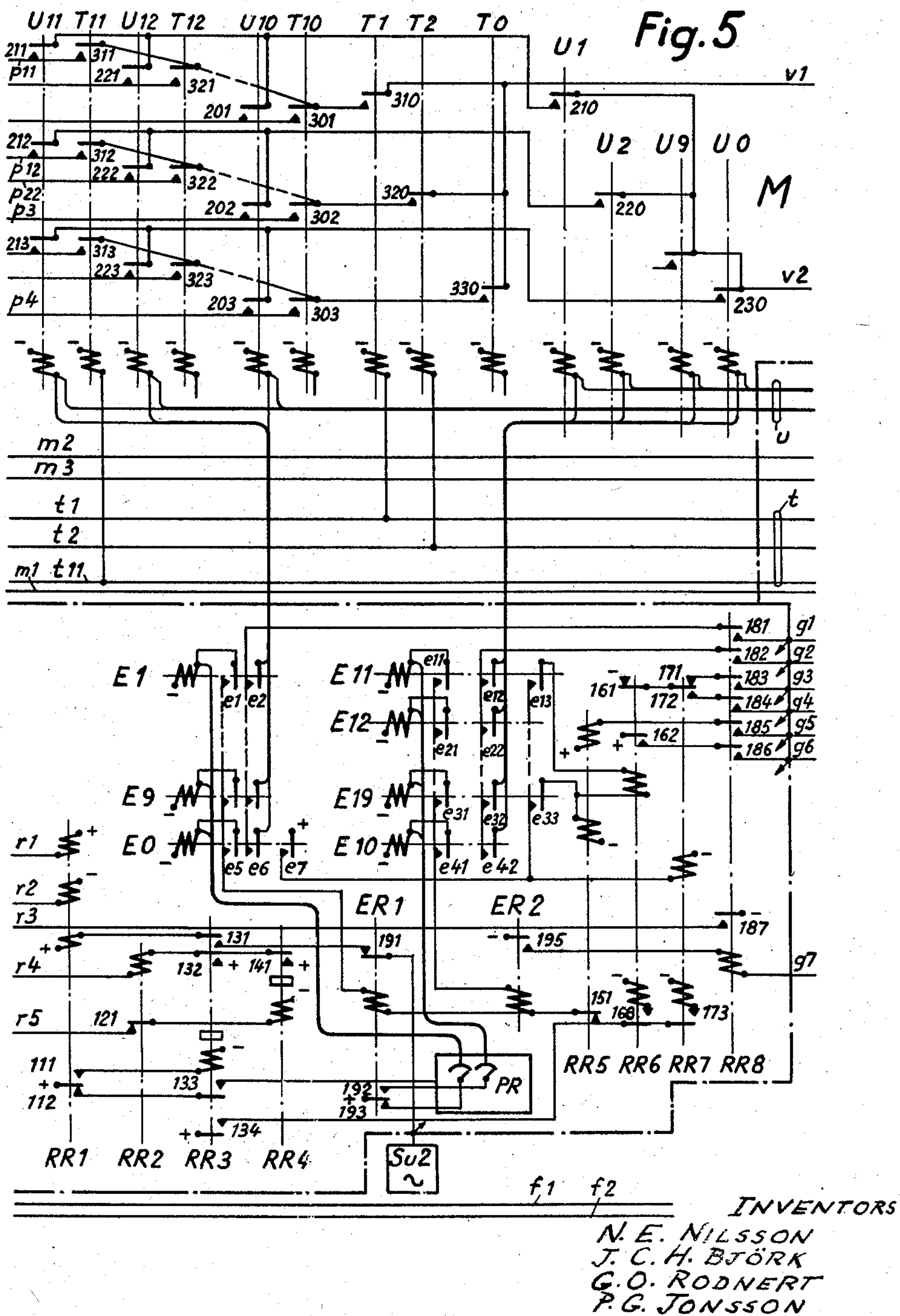
Fig. 5 shows a register REG and part of the marker M.

The contact 95 closes a circuit for selecting a free register: +, the contacts 95, 106—107 and 109, winding on relay H3, wire *r*5, contact 121 in Fig. 5, winding on relay RR4, to negative. The relays H3 and RR4 attract and the contacts 107—109 and 141 are operated. The selecting magnets S11—S19 form a relay chain and the relays H1—H3 another relay chain, in which only one selecting magnet and one relay at a time can attract. Contact 94 breaks the make circuit for all the line relays LR1—LR2 in the tens. The following circuit is closed for the selected register REG: +, contact 141, winding on relay RR2, wire *r*4, winding on operating magnet GB1, to negative. The operating magnet GB1 actuates the contacts *a*5—*d*5. The relays RR2 and D2 are energized through wire *n*4, contact *d*5 and wire *r*4 and attract their armatures. The contacts 55—57 and 121 are operated. Selecting magnet S11 and relay H3 release their armatures. Relay RR4 is slow releasing and during its release time the relays RR1 and RR3 operate in the following circuits: +, the upper winding on relay RR1, wire *r*1, contact *a*5, wire *n*1, the contacts 12 and 21, line L1 and instrument A1, the contacts 24 and 16, wire *n*2, contact *b*5, wire *r*2, the intermediate winding on relay RR1, to negative. The contacts 111—112 are operated. Relay RR3 is energized through the contacts 111 and 188. The contacts 131—134 are actuated. The line L1 is thereby connected to the register REG and the calling subscriber receives dialling tone which is emitted from the buzzer generator S*u*2 through the contacts 191 and 131 through the lower winding of relay RR1.

The calling subscriber dials the number of the instrument A2, whereby the impulse series are repeated by the impulse relay RR1 and transmitted by the contacts 112 and 133 to a relay set PR, which in a known manner counts the impulses, registers the impulse series on the registering means E1—E0 or E11—E10 and is restored to initial position after each impulse series. The first digit, which is 1, is registered by actuation of relay E1.

The contacts $e1$ and $e2$ operate. Relay ER1 attracts when the relay set PR is restored after the first impulse series in the following circuit: +, the contacts 134 and 151, winding on relay ER1, contact $e1$, winding on relay E1, to negative. The contacts 191—193 are operated. Contact 191 disconnects the dialling tone and the contacts 192—193 switch over between the registering means E1—E0 and E11—E10.

The second impulse series, the digit 2, is registered by actuation of the relay E12. The contacts $e21$—$e22$ actuate. Relay ER2 attracts when the relay set PR is restored for the second time through the following circuit: +, the contacts 134 and 151, winding on relay ER2, contact $e11$, winding on relay E11, to negative. The contact 195 is operated.

Figure 6:
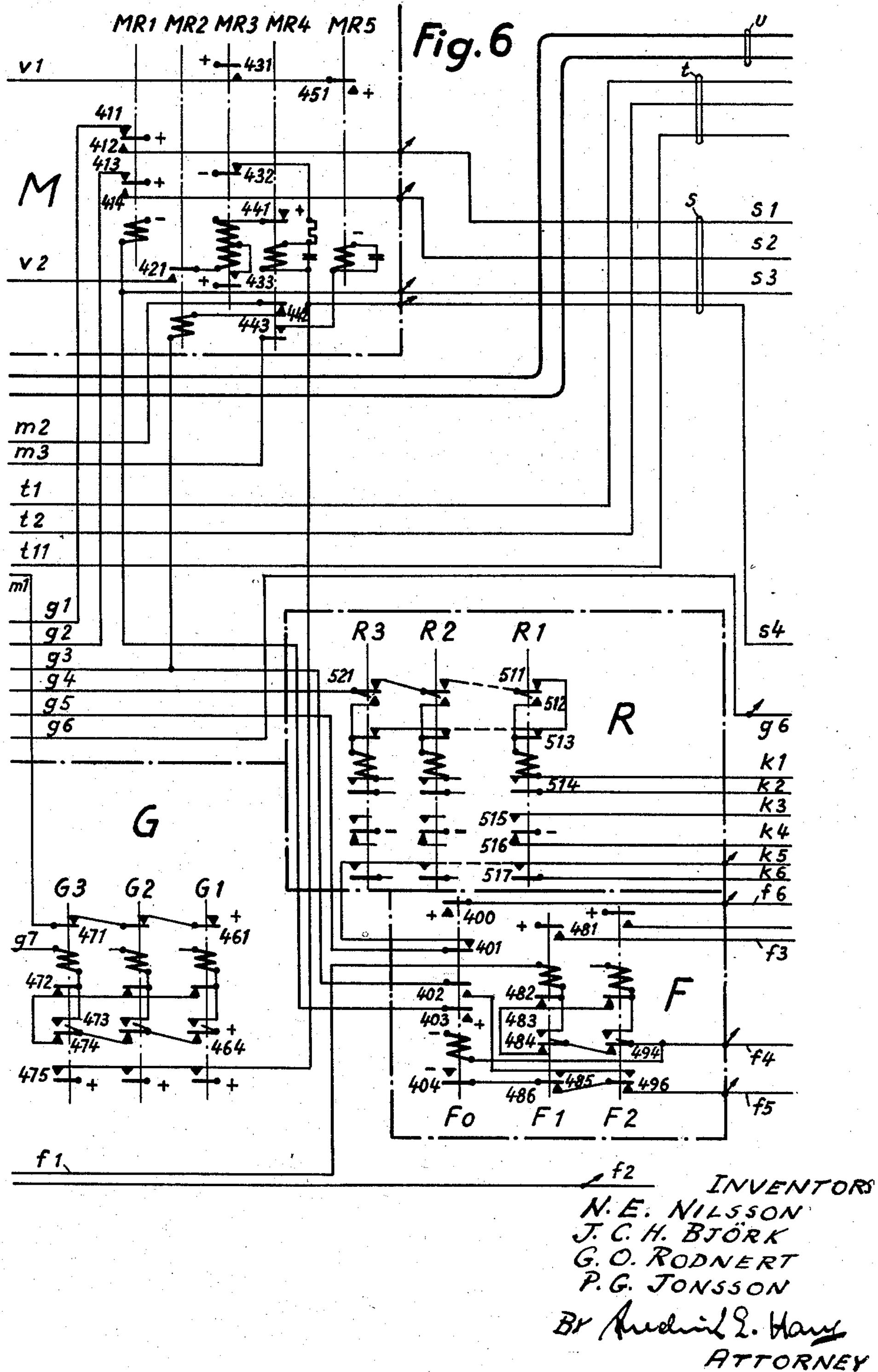
Fig. 6 shows part of the marker M and the relay chains for selecting a free relay set and a free electric talking machine.

If the marker M is free, the following circuit is closed: +, the contacts 464—474 and 472 in Fig. 6, winding on relay G3, wire $g7$, winding on relay RR8, contact 195, to negative. The relays G3 and RR8 attract. The contacts 471—475 and 181—187 operate. The following circuit is closed for identifying the calling subscriber's line L1: +, winding on relay D1 in Fig. 3, wire $n3$, contact $c5$, wire $r3$, contact 187, to negative. Relay D1, which pertains to the tens subscribers, from which the call is coming, attracts and closes on one hand a contact 53 for indicating the tens in the multiple $t$ and on the other hand ten contacts 51, 52. The unit digit of the calling line L1 is indicated by means of the following circuit: +, the contacts 18, 26 and 51, wire $t1$, winding on relay T1 in Fig. 5, to negative. Simultaneously with relay T1 relay T11 attracts with current through wire $t11$ and contact 53. The contacts 311—313 and 310 close.

The following circuits are closed for indicating the called subscriber: +, contacts 411 and 413, wires $g1$ and $g2$, respectively, contacts 181 and $e2$, and 182 and $e12$, respectively, winding on relay $u11$ and $u2$, respectively, to negative. The relays $u11$ and $u2$ attract. The contacts 211—213 and 220 close.

The following circuit is closed for selecting a free link SN: +, winding on selecting magnet S9, wire $d$, contacts 76 and 86, winding on relay H11, contacts 102, 104—105, wire $m2$, contact 442, winding on relay MR2, wire $g3$, contacts 183, 171 and 161, to negative. The relays MR2 and H11 and the selecting magnet S9 attract. The contacts 421 and 101—104 are actuated. The selecting link SN is indicated in all the operating bars for cross-bar switches BL1—BL4.

The contact 475 on relay G3 in Fig. 6 closed a circuit for relay MR4, which is slow operating. During the make time for relay MR4 the condition of the called line is tested through the following circuit: +, contact 144, the upper and the lower windings on relay MR3, of which the upper one has a great resistance, contact 421, wire $v2$, the contacts 220 and 222, wire $p12$, winding on operating magnet B2 in Fig. 3, to negative. If the line L2 is free relay MR3 attracts. The contacts 431—433 are operated. The upper winding on relay MR3 is short-circuited by contact 433, whereafter the operating magnet B2 attracts its armature. The contacts 41—46 and $a2$, $b2$, $c2$ are actuated. The contact 432 breaks the current for relay MR4 and contact 431 closes a circuit over wire $v1$, the contacts 310 and 311, wire $p11$, the winding on operating magnet B1, to negative, for connecting the calling subscriber to the selected link SN. Operating magnet B1 attracts its armature. The contacts 21—26 and $a1$, $b1$, $c1$ are operated. The following circuit is closed: +, the lower winding on relay N2 in Fig. 4 and the contact 71 connected in parallel with the upper winding on relay N3 through contact 83 winding on relay LR1, to negative. The relays N2 and N3 attract and LR1 is kept energized in said circuit. The contacts 81—86 and 88—89 are operated. Over contact 101 and later on 84, + is connected from the wire $c$ and the contacts $c1$ and $c2$ for keeping the operating magnets B1 and B2 and for busy marking. Call-signals are sent from the instrument A2 from the ring generator RG through the transformer RGT and the upper contact spring group in an interruptor RP, contact 88, the upper winding on relay N1, contact 73, wire $b$, contacts $b2$, 33 and 43, line L2, instrument A2, contact $a2$, wire $a$, contact 71, electrolytic condenser C1, the intermediate winding on relay N2, to positive. The contact 13 on the line relay LR1 in Fig. 3 prevents ringing current from passing the line L1. Instead, an intermittent buzzer signal is sent to the instrument A1 from a buzzer generator $Su3$ through contact 81, is transformed between the upper winding and the intermediate winding on relay N and passes through wire $a$ to line L1. When the operating magnet B1 attracted, the contacts 21 and 24 broke the current for relay RR1 in Fig. 5, which relay releases its armature. Contact 111 opens. When relay RR3 releases its armature the contacts 131—134 open and the register is restored to initial position. The contact 195 is opened and the relays RR8 and G3 release. The marker M is released. The relays MR2 and H11, which were kept energized by the contact 101, the selecting magnet S9 and the relays MR3, U11, T11, T1 and U2, release their armatures.

The set up communication is held from the instrument A1 by means of the relays LR1 and N2. When the subscriber at the instrument A2 answers, the following circuit is closed: +, the lower winding on relay N2 connected in series with the upper winding of relay N3 through contact 82, contact 71, wire $a$, contact $a2$, line L2, instrument A2, the contacts 43, 33 and $b2$, wire $b$, contact 73, the upper winding on relay N1, contact 88 to negative through the upper contact spring group in the interruptor RP directly or in series with the left winding on transformer RGT, depending on the position of the interruptor. Relay N1 is slow-actuating and is not operated by ring current but attracts its armature in said D.C. circuit. The condensers 71—76 are operated. Contact 71 breaks the current for the line relay LR1, which releases its armature, as does relay N3. Contact 73 breaks the ring current. Relay N2 releases slowly owing to the electrolytic condenser C1 and relay N1 is kept energized through contact 85 by its lower winding. When relay N2 releases its armature, relay N1 is kept owing to its slowness until relay N3 has attracted again in the following circuit: +, the upper winding on relay N3, contact 83, wire $a$, contacts $a1$ and $a2$, respectively, line L1 and instrument A1, and line L2 and instrument A2, respectively, the contacts 23, 13 and $b1$, and 43, 33 and $b2$, respectively, wire $b$, contact 74, the lower winding on relay N3, to negative. The contacts 88—89 close again, whereafter relay N1 is kept energized through contact 89 and the communication is held until both subscribers have put down their handsets.

Had the called instrument A2 been busy, the testing relay MR3 would not have attracted, but relay MR4 had instead attracted its armature and the contacts 441—443 been actuated. The following circuit is closed: +, winding on selecting magnet S0 in Fig. 3, wire $m3$, contact 443, winding on relay MR5, to negative. The selecting magnet S9 releases and the selecting magnet S0 attracts quickly, whereas relay MR3 is slow-operating owing to a condenser, which is connected in parallel with the winding on relay MR5. Contact 451 closes the circuit from the operating magnet B1 in Fig. 3, which attracts. The contacts 21—26 and $ao$, $co$, are operated. The following circuit is closed for holding the line relay LR1: +, a choke coil D, contact $ao$, line L1, instrument A1, the contacts 23 and 14, winding on relay LR1 to negative. the operating magnet B1 is kept energized through the contacts 18 and $co$. The calling subscriber hears busy tone which is emitted from a buzzer generator $Su1$ through the condenser $Co$. The register and the marker are released as described above. If the subscriber at the instrument A2 pays a visit to the subscriber with the instrument A1 and wishes a call to the instrument A2 to be connected to the instrument A1, he dials the directive digit 09 from the instrument A1. The call is connected to a register REG as described above and the directive digit 09 is taken. The relays E0 and ER1 in Fig. 5 attract after the first digit. The contacts $e5$—$e7$ and 191—193 are actuated. Relay RR7 attracts with current through its lower winding and is thereafter kept energized over the contacts 134 and 162 through its lower winding. The contacts 171—173 are actuated. After the second digit having been taken as well, the relays E19 and ER2 attract. The contacts $e31$—$e33$ are closed. Relay RR5 is energized through its lower winding and attracts its armature. The contact 151 is actuated and the current through the relays ER1, E0 and ER2, E19 is broken, owing to what the register is able to record two new digits. The registering 09 is marked by relay RR7, which is kept energized through its lower winding over the contacts 134 and 173. The calling subscriber again hears a dialling tone, when relay ER1 releases its armature and contact 191 is closed.

The subscriber now dials the number of the instrument A2, which is registered by operation of the relays E1—ER1 and E12 and ER2. The relays RR8 and G3 attract as described above. The contacts 181—187 and 471—475 are actuated. The following circuit is closed: +, winding on relay RO2 in Fig. 7 in a free switch RO, contact 612, wire $k1$, winding on relay R1, contacts 513, 511—521, wire $g4$, contacts 184, 172 and 161, to negative. The relays R1—R3 form a relay chain, in which only one relay at a time can be operated. The relays R1 and RO2 attract. The contacts 511—517 and 621—626 are operated. Relay RO4 attracts with current through contact 632, wire $k3$ and contact 515. The contacts 641—648 are closed. At the same time the calling subscriber's instrument A$o$ is marked in the multiple $t$ by means of the identifier, the relay D1 of which in Fig. 3 is energized through contact 187 as described above, and the calling instrument A2 is marked in the multiple $u$ through the circuits to the relays U11 and U2 through the contacts $e2$, 181, 411 and $e12$, 182, 413.

Figure 7:
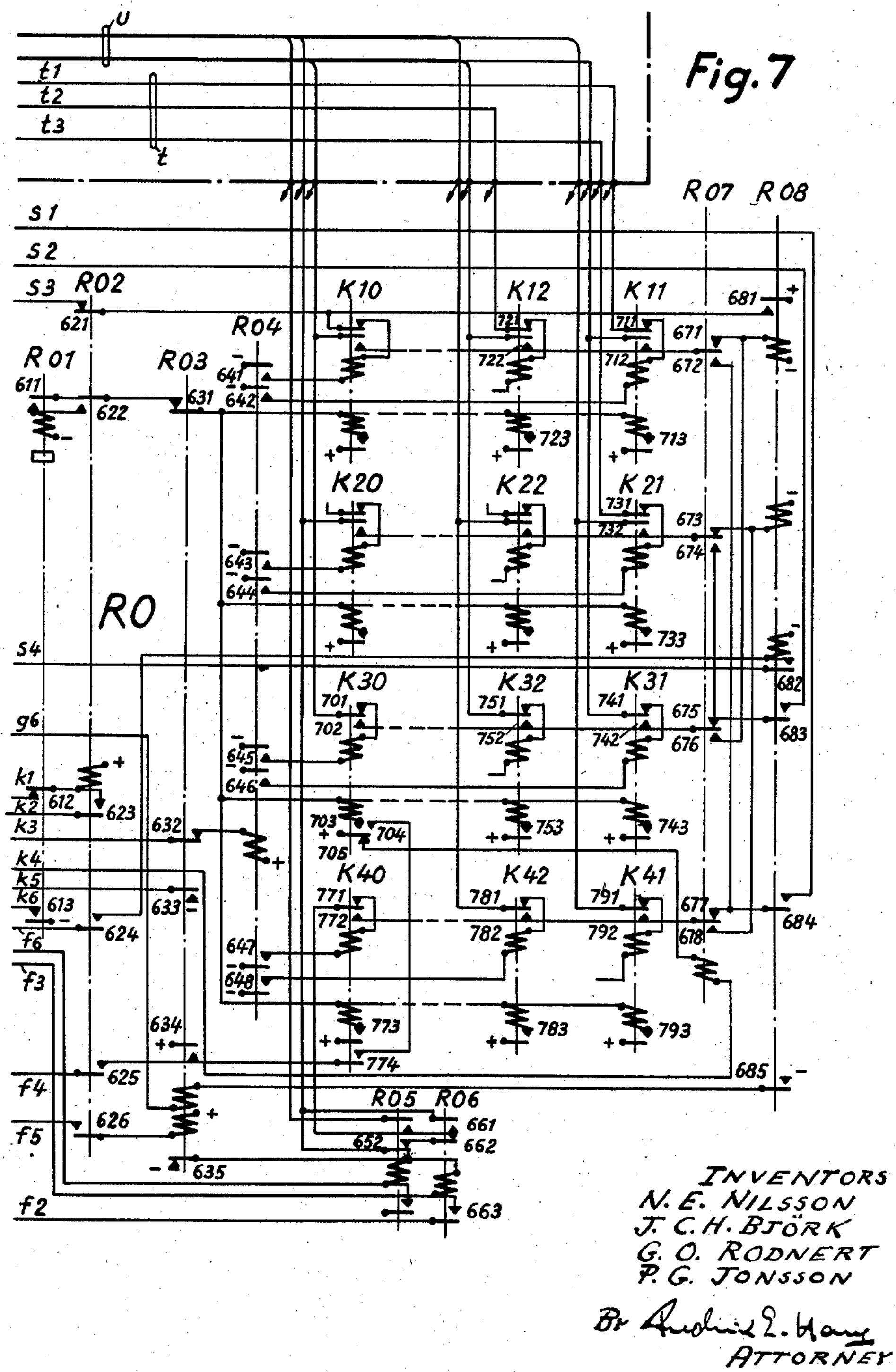
Fig. 7 shows a relay set RO.

Owing to the marking in the multiple $t$ the relays K11 and K21 in Fig. 7 attract in the following circuits:

($a$) +, contact 53 in Fig. 3, wire $t11$, contact 731 in Fig. 7, the upper winding on relay K21, contact 644 to negative.

($b$) +, the contacts 18, 26 and 51 in Fig. 3, wire $t1$, contact 711, the upper winding on relay K11, contact 642 to negative.

The contacts 711—713 and 731—733 are operated. The relays K11 and K21 are thereafter kept energized through their lower winding, the contacts 713, 733, 631 and 622, respectively, and the winding on relay RO1, which latter relay is slow operating and does not yet attract its armature.

Owing to the marking in the multiple $u$ the relays K31 and K42 attract in the following circuits:

($a$) +, contact 411 in Fig. 6, wire $g1$, contacts 181 and $e2$, the multiple $u$, contact 741, the upper winding on relay K31, contact 646, to negative.

($b$) +, the contact 413, wire $g2$, the contacts 182 and $e12$, multiple $u$, contact 781, the upper winding on relay K42, contact 648, to negative.

The contacts 741—743 and 781—783 are operated. The relays K31 and K42 are thereafter kept energized through their lower winding, the contacts 743 and 783, 621 and 622, respectively, and the winding on relay RO1, which now attracts its armature. The contacts 611—613 are operated. The following circuit is closed: +, the upper winding on relay RR5 in Fig. 5, contact 185, wire $g5$, the contacts 401 and 517, wire $k6$, contact 613, to negative. Relay RR5 attracts. Contact 151 is operated and the register is restored to normal for the second time. The relays E1, ER1, E12 and ER2 as well as RR8, C3, R1 and RO2 release.

The calling subscriber again hears dialling tone and must now set down his handset. In the relay set RO the following circuit is closed: +, contact 705, winding on relay RO7, wire $k4$, contact 516, to negative. Relay RO7 attracts its armature. The contacts 671—678 are operated and switch the windings of the control relay RO8 from the multiple $u$ to the multiple $t$, which takes place since in this case the calls to the number marked in the multiple $u$ are to be switched, whereas in other cases, described below in connection with the directive digits 00 and 01 the number marked in the multiple $t$ is to be supervised.

The relay RO8 is made in such a way, that it attracts if its upper and its intermediate windings are simultaneously energized, which takes place only if both digits in a called number correspond to the number registered in the switch for the multiple $u$, in this case the number 12 of the instrument A2.

If hereafter a subscriber with for example the number 22 initiates a call to instrument A2 in accordance with what has been described above, the number 12 is registered in the register REG, whereafter the register is connected to the marker M. The relays U11 and U2 are energized through the contacts $e2$ and $e12$, respectively, in the register REG. The following circuits are simultaneously closed:

($a$) +, contact 411 in Fig. 6, wire $g1$, the contacts 181 and $e2$, multiple $u$, the contacts 742 and 676 in Fig. 7, the upper winding on relay RO8, to negative.

($b$) +, contact 413, wire $g2$, the contacts 182 and $e12$, multiple $u$, the contacts 782 and 678, the intermediate winding on relay RO8, to negative.

Relay RO8 attracts its armature. The contacts 681—685 are closed. The following circuits are closed: +, the contacts 681 and 621, wire $s3$, winding on relay MR1, to negative. The contacts 411—414 are operated. The marking circuits are switched from the wires $g1$ and $g2$, which pass the register, to the wires $s1$ and $s2$, which pass the relay set RO. Relay RO8 is kept energized through its lower winding, the contact 682, wire $s4$ and contact 475.

The following circuits are closed:

($a$) +, contact 412, wire $s1$, the contacts 684, 672 and 712, multiple $u$, winding on relay U11, to negative.

($b$) +, contact 414, wire $s2$, the contacts 683, 674 and 732, winding on relay U1, to negative.

The relays U11 and U1 attract. The contacts 211—213 and 210 closed. A free link SN is selected and its selecting magnet, i.e. S9, attracts, as described above. Relay MR2 attracts. The testing relay MR3 is connected through the contacts 421, 210 and 211 to the wire $p11$ pertaining to the instrument A1. At the same time the calling subscriber's line is identified by the identifier D, the relays T12 and T2 attracting at call from number 22.

If the instrument A1 is free, the testing relay MR3 attracts. The contacts 431—433 are operated. The operating magnet B1 and the operating magnet corresponding to wire $p22$, which magnet is not shown in Fig. 3 owing to lack of space, attract, and the calling line and line L1 are connected to the link SN. The calling signal is emitted from the instrument A1. The calling subscriber has thus automatically been connected to the instrument A1 when he dialled the number of instrument A2.

When the subscriber at instrument A2 departs from the location of the instrument A1, he cancels the switching by dialling the directive digit 01 and thereafter his own number. The cancellation can be effected from any instrument in the exchange. When the directive digit 01 is registered in a register REG, the relays E0, ER1, RR7 and E11, ER2 attract. The relays RR5 and RR6 attract in the following circuit: +, the contacts $e7$ and $e13$, the upper winding on relay RR6, the lower winding on relay RR5, to negative. The contacts 161—163 and 151 are operated. The registering relays E0, ER1, E11 and ER2 release whereas the relays RR6 and RR7 are kept energized through their lower windings and the contacts 163 and 173, respectively. The subscriber again hears dialling tone, when the contact 191 is closed. The subscriber thereafter dials his own number, in this case 12, which number is registered in the register REG by operation of the relays E1, ER1, E12, ER2. The relays RR8 and G3 have now time to attract. The contacts 181—187 and 471—475 are operated. The above mentioned circuits for operation of relay RO8 in relay set RO, which is set for number 12, is closed. Relay RO8 in Fig. 7, attracts. The contacts 681—685 are closed. The following circuits are closed: +, the contacts 162 and 186, wire $g6$, the upper winding on relay RO3, contact 685, to negative. Relay RO3 attracts, the contact 631—635 are operated. The relays K11, K21, K31 and K41 release. The following circuit is closed: +, winding on relay RR5, contact 185, wire $g5$, contact 401, wire $k5$, contact 633, to negative. Relay RR5 attracts, contact 151 is operated. The relays E1, ER1, E12, ER2, RR8 and G3 release. The subscriber again hears dialling tone and should now put down his handset. In the relay set RO the relays RO3 and RO8 and, last RO1, which is slow releasing, release, whereafter the relay set RO is free.

Further switching possibilities may be obtained with the invention by means of electrical talking machines. An electrical talking machine T1 in Fig. 3, which, when starting, sends a prerecorded message, for example "out call the information," has been allotted a directive number 02. Supposing that the subscriber at the instrument at the instrument A1 with the telephone number 11 is to be away for some time and wishes said message to be given in answer to a call to his instrument, he dials the directive digit 02 from his instrument A1. The digits 02 are registered in the register REG, Fig. 5, by operation of the relays E0, ER1, E11, ER2 and RR7. The contacts $e5$—$e7$, $e21$—$e22$, 171—173 and 191—193 and 195 are operated. The relays RR8, G3, and for example R1 are operated, as described above, whereby a free relay set RO has been selected. The relays RO2 and RO4 in the relay set according to Fig. 7 attract.

The calling instrument A1 is identified by operation of relay D1 in Fig. 3 as described above and is indicated in the multiple $t$ by means of the wires $t1$ and $t11$. The relays K11 and K21 in Fig. 7 attract. The contacts 711—713 and 731—733 are operated. Simultaneously, the number 01 is marked in the multiple $u$ through the following circuits:

(a) +, contact 411, wire $g1$, the contacts 181 and $e6$, the multiple $u$, contact 701, winding on relay K30, contact 645, to negative.

(b) +, contact 413, wire $g2$, contacts 182 and $e22$, multiple $u$, contact 781, winding on relay K42, contact 648, to negative. The relays K30 and K42 in Fig. 7 attract. The contacts 701—705 and 781—783 are operated. Relay RO1 attracts in the holding circuits through the contacts 622, 631, 713, 733, and 783, respectively. Relay RR5 in Fig. 5 is energized through the contacts 185, 401, 517, and 613 and restored the register REG to normal by operating contact 151 so, that the relays E0, ER1, E12, ER2, RR8 and G3 and R1 release. The subscriber again hears dialling tone and has now to put down his handset.

Calls to the instrument A1 are thereafter automatically connected to the electrical talking machine T1. We suppose now that a call is initiated from instrument A2 to instrument A1. The number 11 is thereby registered in the register REG by the relays E1, ER1 and E11, ER2 attracting. The relays RR8 and G3 attract. The following circuits are closed:

(a) +, contact 411, wire $g1$, contacts 181 and $e2$, multiple $u$, contacts 712 and 671 in Fig. 7, the upper winding on relay RO8, to negative.

(b) +, contact 413, wire $g2$, the contacts 182 and $e12$, multiple $u$, the contacts 732 and 673, the intermediate winding on relay RO8, to negative.

Relay RO8 in the switch, which has registered the subscriber's number 11, attracts. The contacts 681—685 are operated. Relay RO8 is kept energized through its lower winding. Relay MR1 in Fig. 6 is energized through contact 681. The contacts 411—414 are operated. The following circuits are closed:

(a) +, contact 414, wire $s2$, the contacts 683, 675 and 702, multiple $u$, winding on relay U10, to negative.

(b) +, contact 412, wire $s1$, the contacts 684, 677, and 782, multiple $u$, winding on relay U2, to negative.

The relays U10 and U2 attract. The contacts 201—203 and 220 are closed.

In the meantime a free link SN has been selected as described and relay MR2 connects the testing relay MR3 in the following circuit:

+, contact 441, the upper and lower windings on relay MR3, contact 421, wire $v2$, the contacts 220 and 202, wire $p3$, winding on operating magnet B3 in Fig. 3, to negative. If the electrical talking machine T1 is free, the testing relay MR3 attracts. The contacts 431—433 are operated. The operating magnet B3 attracts in the testing circuit after the upper winding on relay MR3 has been short-circuited. The contacts $a3$, $b3$, $c3$ are operated.

At the same time the calling instrument A2 has been identified as described above through operation of relay D1 in Fig. 3 and the relays T2 and T11 have attracted so that the contacts 320 and 312 are closed. The operating magnet B2 attracts. The contacts 31—36, $a2$—$b2$ are operated. Relay LR2 is kept energized in series with the relays N2 and N3 in the link and call signal is sent to the electrical talking machine T1 according to what has been described in the preceding. In this case the call signal is immediately broken through the following circuit: +, the lower contact in the interruptor RP, wire $f3$, choke coil Z1, rectifier $re1$, contact $b3$, wire $b$, contact 73, the upper winding on relay N1, contact 88, the upper contact spring group in the interruptor RP, to negative directly or over the transformer RGT. Relay N1 attracts. The contacts 71—76 are operated. Line relay LR1 and relay N2 release. The instrument A1 is connected with the electrical talking machine T1 through the contacts $a2$, $b2$, $a3$, $b3$. The electrical talking machine T1 is started by relays, which are energized over contact $c3$.

After the calling subscriber has listened to the message of the electrical talking machine, he puts down his handset so that the circuit through line L2 and instrument A2 is broken. As soon as the interruptor RP thereafter operates its lower contact, the current through the choke coil D1 and the lower winding of the current feeding relay N3 is broken. The relays N3 and N1 release and the connection is interrupted.

The electrical talking machine T2 in Fig. 3 pertains to a group of electrical talking machines, which have in common the directive number 00, and are arranged in such a manner that a subscriber can talk in an arbitrary, short communication on any of the electrical talking machines, whereafter all the calls to the subscriber's number are switched to said electrical talking machine and receive said communication.

If for example the subscriber with the number 11 wishes to close his instrument A1 by switching all incoming calls to an electrical talking machine T2, which automatically answers with a communication, he dials the directive number 00 from the instrument A1. The number 00 is registered in the register REG by the relays E0, ER1, E10, ER2 and RR7 attracting. The contacts $e5$—$e7$, 191—193, $e41$—$e42$, 195 and 171—173 are operated. The relays RR8, G3 and for example R1 and RO2 and RO4 attract. The contacts 181—187, 471—475, 511—517, 621—626, and 641—648 are operated. The number of the calling instrument is identified, is indicated in the multiple *t* and registered in the relay set RO whereby the relays K11 and K21 attract. The directive number 00 is indicated in the multiple *u* through circuits over the contacts *e*6 and *e*42 and is registered in the relay set RO also by the relays K30 and K40 attracting. The circuit for relay K40 passes the contacts 413, *e*42, multiple *u*, the contacts 652—662, 771 and 647. The contacts 711—713, 731—733, 701—705 and 771—774 are operated. During the operation time for relay RO1 a free electrical talking machine T2 is selected, through for example the following circuit: +, the contacts 704, 774, 625, wire *f*4, through the contacts 494, 484, 482, winding on relay F1, wire *f*1, contact 602, to negative, and also through the winding on relay F*o*, to negative. The relays F1—F2 form a relay chain, in which only one relay at a time can attract. We suppose now that relay F1 and relay F*o* attract. The contacts 491—486 and 400—404 are operated. Not until now does relay RO1 attract and actuate the contacts 611—613. Relay RO6 attracts in the following circuit: +, contact 481, wire *f*3, winding on relay RO6, contact 635, to negative. The contacts 661—663 attract, whereafter relay RO6 attracts in the following circuit: +, relay FR1 in Fig. 3, wire *f*2, contact 663, winding on relay RO6, contact 635, to negative. Contact 400 closes a circuit over wire *f*6 and contact 624 for relay RO8 and contact 403 closes a circuit for relay MR1. The relays RO8 and MR1 attract. The contacts 681—685 and 411—414 are operated, whereby the marking circuits to the multiple *u* are switched from the register REG to the selected relay set RO. The contacts 404, 485 and 402 close the circuit through relay MR2 and wire *m*2 for the selection of a free link SN. The relays MR2 and H11 and the operating magnet S9 are supposed to attract.

The electrical talking machine T2 selected through the relays F1 and RO6 according to the preceding is connected to the marking wire for the digit combination 00, as is seen in Fig. 7, whereas the electrical talking machine corresponding to the relays F2 and RO5 is supposed to be connected to the marking wire for the digit combination 09, which, according to the above description, is not used for any subscriber's line or other electrical talking machine. The following circuits are closed for marking the selected electrical talking machine T2:

(*a*) +, contact 414, wire *s*2, the contacts 683, 675, 702, multiple *u*, winding on relay *u*10, to negative.

(*b*) +, contact 412, wire *s*1, the contacts 684, 677, 772, 661, multiple *u*, winding on relay *uo*, to negative.

The contacts 201—203 and 230 are actuated. The testing relay MR3 is connected over the contacts 421, 230, 203 and the marking wire *p*4 to the operating magnet B4 in Fig. 3, and attract. The contacts 431—433 are operated and the operating magnet B4 attracts. The contacts *a*4, *b*4, *c*4 close. At the same time, the calling subscriber A1 is identified according to the above description and indicated through operation of the relays T11 and T1, owing to what operating magnet B1 also attracts. The contacts 21—26 and *a*1—*c*1 are operated. The instrument A1 is thereafter connected to the electrical talking machine T2. The relays N2 and N3 attract in series with the line relay LR1. The calling signal is broken by relay N1 attracting in the following circuit: +, the lower contact in the interruptor RP, wire *f*3, choke coil Z2, rectifier 2, contact *b*4, wire *b*, contact 73, the upper winding on relay N1, contact 88, the upper contact spring group in the interruptor RP, to negative.

The electrical talking machine T2 and the amplifier TF2 are started by relays TFR, which are energized through contact *c*4. The calling subscriber hears a short dialing tone and then has 30 seconds to talk in a communication. A current impulse is thereafter sent from the electrical talking machine to relay FR2, which attracts its armature. The contacts 61—69 are operated, whereafter relay FR2 is kept energized over contacts 69 and 601. The input and output of the amplifier TF2 are switched by the contacts 61—68, and the calling subscriber can listen to the talked-in message. The subscriber is thereafter to put down his handset.

If there is no free electrical talking machine T2 when the relays K30 and K40 in the relay set RO attract, relay F0 but none of the relays F1—F2 will attract. The following circuit is closed: +, the lower winding on relay RO3, contact 626, wire *f*5, contacts 496, 486 and 404, to negative. Relay RO3 attracts. The contacts 631—635 are operated. The relays RO4, K11, K21, K30 and K40 release. Relay F0 is kept energized through contact 634. No connection is set up before relay MR4 in Fig. 6 attracts. The contacts 441—443 are actuated. Relay MR5 and selecting magnet S*o* attract. The operating magnet B1 attracts and the instrument A1 is connected to the buzzer generator S*u*1 and hears busy signal.

If the electrical talking machine T2 were free and a message were talked-in by the subscriber with the number 11, all the calls to number 11 would thereafter automatically be connected to the electrical talking machine T2 and be answered to with said message. Supposing that a call is initiated from the instrument A2 to number 11, the line relay LR2 attracts and line L2 is connected to the register REG as described above for the instrument A1. The subscriber dials number 11 on his dial and the number is registered through the relays E1, ER1, E11 and ER2 attracting. The relays RR8 and G3 attract. The calling subscriber A2 is identified and indicated, whereby the relays T11 and T2 attract. The called number is indicated in the multiple *u*, the relays *u*11 and *u*1 attracting first simultaneously with relay RO8, in the relay set in Fig. 7. Relay RO8 is kept energized through its lower winding and relay MR1 in Fig. 6 switches the marking from register REG to relay set RO, the relays U11 and U1 thereby releasing and the relays U10 and U*o* instead attracting. A link SN is selected and the relays MR2 in Fig. 6 and H11 in Fig. 4 as well as selecting magnet S9 in Fig. 3 are supposed to attract. The testing relay MR3 attracts if the electrical talking machine T2 is free. The operating magnets B2 and B4 attract and the instrument A2 is thereby connected to the electrical talking machine T2. The calling signal is broken and the electrical talking machine T2 and its amplifier TF2 start. The calling subscriber hears the message given by the talking machine, which is repeated until the subscriber puts down his handset, which causes the connection to be released and the electrical talking machine to stop.

We claim:

1. In an automatic telephone system with automatic transfer service, in combination, subscriber's lines, selectors, registers, a marker, means for connecting said registers one at a time to said marker, groups of marking conductors for marking the telephone number of a called line from the respective register connected to the marker, a number of relay sets, means operated when a register, which by a call has registered a directive number, is connected to the marker, said means, when operated, connecting an idle one of said relay sets to said marking conductors, each of said relay sets including registering means for a telephone number to which calls are transferred and registering means for a telephone number which is to be marked for automatic transfer service, a relay in the marker, control means controlling when the relay set has been connected to said marking conductors by a call to said directive number said marker relay in response to a call to that telephone number registered in the relay set which is marked for automatic transfer service, and circuits in the marker switched by said marker relay for setting up a communication over said selectors to the other number registered in the relay set instead of to the called number marked for automatic transfer service.

2. An automatic telephone system according to claim 1 comprising means identifying the telephone number of the subscriber's line which calls said directive number, and means transmitting the identified number to the registering means in said idle relay set.

3. An automatic telephone system according to claim 1 comprising means in said registers for registering simultaneously a subscriber's number and said directive number, and circuit means transmitting said subscriber's number to the registering means in said idle relay set by means of said marking conductors.

4. An automatic telephone system according to claim 3 further comprising identifying means which identifies the number of the subscriber's line calling said directive number, and means transmitting the identified number to the registering means in said idle relay set.

5. An automatic telephone system according to claim 4 further comprising a relay means in each relay set connecting said control means to the one registering means in the idle relay set in which the identified subscriber's number is registered when a directive number is transmitted to the relay set over said marking conductors and to the one registering means in the idle relay set in which the telephone number transmitted over said marking conductors is registered when the transmitted telephone number is a subscriber's number.

6. An automatic telephone system according to claim 1 further comprising a number of electric sound recording and reproducing means, means actuated, when a certain directive number is transmitted and registered in said idle relay set, for coupling one of said recording and reproducing means with the relay set, and means connecting the identified calling subscriber's line to the coupled one of said means for recording a message, calls to said identified subscriber's line thereafter being connected to said coupled means for receiving a message recorded thereon.

References Cited in the file of this patent

UNITED STATES PATENTS

| | | |
|---|---|---|
| 1,744,696 | Friendly | Jan. 21, 1930 |
| 2,341,693 | Clay | Feb. 15, 1944 |
| 2,539,139 | Jordanoff et al. | Jan. 23, 1951 |
| 2,558,040 | Carter | June 26, 1951 |